(12) United States Patent
Dubal et al.

(10) Patent No.: US 7,581,029 B2
(45) Date of Patent: Aug. 25, 2009

(54) UPDATING MACHINES WHILE DISCONNECTED FROM AN UPDATE SOURCE

(75) Inventors: Scott P. Dubal, Hillsboro, OR (US); Douglas D. Boom, Portland, OR (US); Elizabeth M. Kappler, Hillsboro, OR (US); Mark V. Montecalvo, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 763 days.

(21) Appl. No.: 11/157,334

(22) Filed: Jun. 20, 2005

(65) Prior Publication Data

US 2007/0006214 A1 Jan. 4, 2007

(51) Int. Cl.
*G06F 15/16* (2006.01)
(52) U.S. Cl. .................... 709/248; 709/220
(58) Field of Classification Search ......... 709/220–222, 709/248; 713/1–2, 100
See application file for complete search history.

(56) References Cited

U.S. PATENT DOCUMENTS 6,959,331 B1* 10/2005 Traversat et al. ............ 709/222
2002/0156875 A1* 10/2002 Pabla ......................... 709/220
2005/0182906 A1* 8/2005 Chatterjee et al. ........... 711/144
2006/0206699 A1* 9/2006 Yokota et al. ................ 713/1

* cited by examiner

*Primary Examiner*—Salad Abdullahi
(74) *Attorney, Agent, or Firm*—Schwabe, Williamson & Wyatt, P.C.

(57) ABSTRACT

Disclosed are exemplary embodiments for updating a networked machine having at least a dormant state and an active state. In various embodiments, when the machine it is a dormant state, it listens to a network for candidate updates, that is, updates that may be applicable to the machine. In some embodiments, determining the candidate update is an applicable update for the machine may be based at least in part on a variety of reasons, including testing if it has already been applied, does not actually update some aspect of the machine, conflicts with an existing configuration of the machine, conflicts with a policy of the machine, etc. The machine may cache some or all of the candidate updates or applicable updates, where a variety of rationales or policies may be used to control update retention. When the machine enters an active state, such as a power on or non-sleep mode, or other active state, the machine may validate integrity of an applicable update if not done while the machine was dormant, and optionally choose to install it.

24 Claims, 4 Drawing Sheets

UPDATING MACHINES WHILE DISCONNECTED FROM AN UPDATE SOURCE

FIELD OF THE INVENTION

The invention generally relates to updating networked machines and more particularly to receiving and electing to cache updates while a machine is in a dormant state or undocked state for installation after leaving the dormant or undocked state.

BACKGROUND

Security and stability concerns incident to rapid propagation of viruses, worms, and other intentional and/or unintentionally nefarious code has led to attempts to providing software updates to networked machines. Unfortunately, the desire to provide updates can be stymied by devices leaving the network over which updates are received. Thus, while a patch or update may be applied to many machines on a network, such as by using the Microsoft® System Management Services (SMS), machines that have gone dormant, and if infected when removed from the network, pose a risk of re-infecting the network upon reattachment to the network.

In an effort to avoid risk of infection or re-infection of a network, some network environments implement on-connect policies that are applied to a connecting machine in order to validate its state before it is allowed on to a network, e.g., a policy may be to verify current software on the machine before it may generally communicate with the network. Unfortunately, there is a "chicken and the egg" type problem in that a machine may be denied access from the very network from which it needs to receive an approved update to make the machine suitable to be connected with the network!

BRIEF DESCRIPTION OF THE DRAWINGS

The features and advantages of the present invention will become apparent from the following detailed description of the present invention in which.

DETAILED DESCRIPTION

To overcome the "chicken and the egg" problem, disclosed are various illustrative embodiments for receiving caching updates while a machine is dormant. It will be appreciated by a skilled artisan there are various ways in which a machine may become unable to receive at least one update, such as when a computer is removed from a network by, for example, undocking it from a docking station, powering it off, entering a low-power or no-power state, entering an idle state, losing network connectivity, turning off a wireless transceiver, etc. In the following description and claims that follow, rather than repeatedly enumerate various conditions in which a machine may be unable to receive at least one update, the term "dormant" will be used to generally refer these and other events or states rendering a machine unable to receive at least one update.

Regarding receiving updates while a machine is dormant, an update may be received by an interface to a data path interface, such as a network interface card, that remains operable even when the machine is dormant. Alternatively, rather than (or in addition to) a portion of the machine remaining active while the rest is dormant, instead a separate article associated with the machine, such as a docking station, printer, fax, other device which may be communicatively coupled to the machine, such article may be used to receive and cache updates sent while the machine is dormant.

Figure 1:
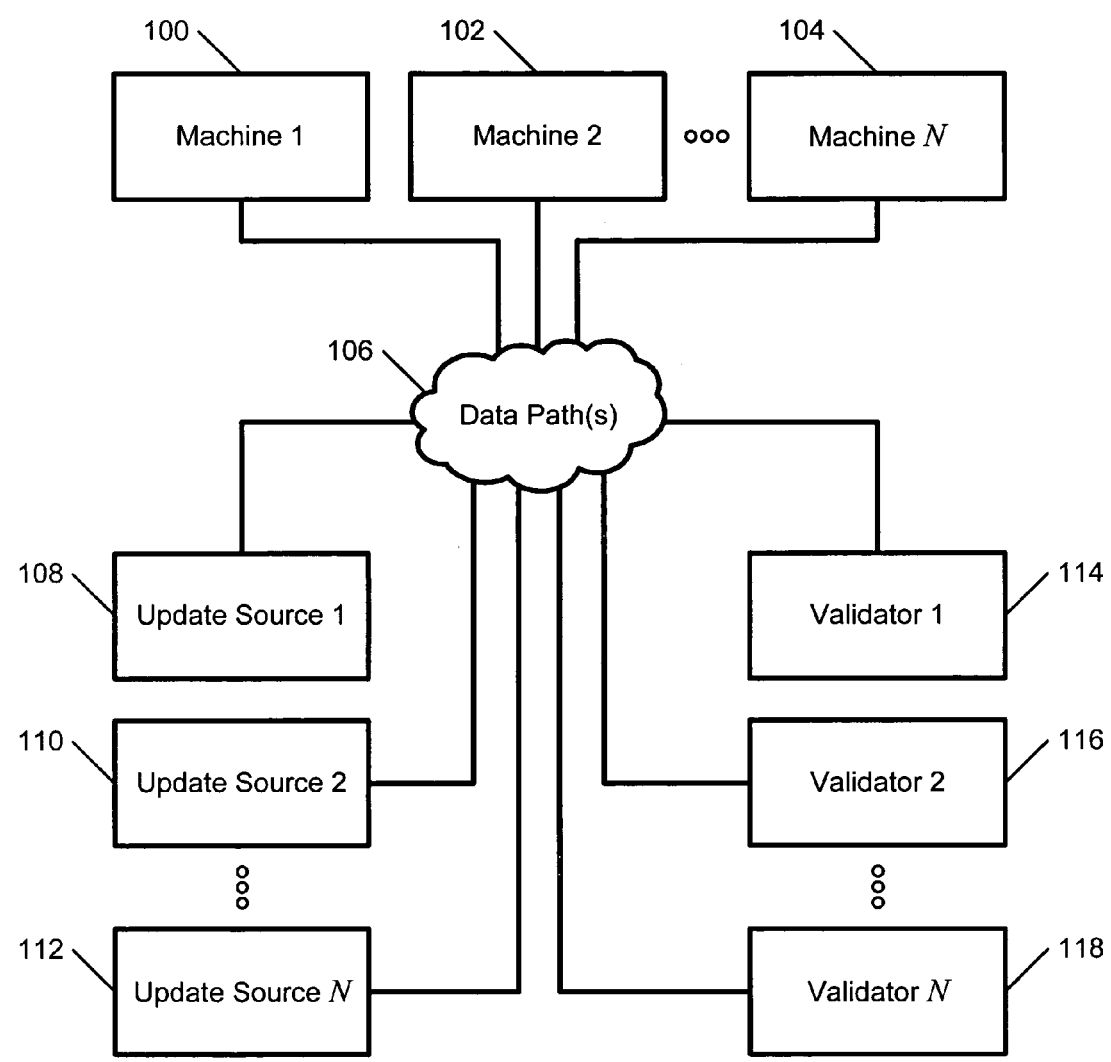
FIG. 1 illustrates according to one embodiment a system of machines that may cooperate to provide updates to networked machines.

FIG. 1 illustrates according to one embodiment a system of machines that may cooperate to provide updates, including software updates, to networked machines 100-104 communicatively coupled by way of a data path or data paths 106 such as one or more of a local bus, a network such as an intranet or the Internet, etc. Also attached to the data paths are an arbitrary number of one or more Update Sources 108-112.

There may be many different Update Sources depending on a particular machine's requirements, including traditional update sources such as from an Information Technology (IT) department within a corporation, as well as directly from vendors of equipment and/or software within a particular machine, from peer devices caching updates received over the data path 106, and the like. Regarding peer devices, it will be appreciated a machine requiring an update may have been dormant with respect to the data path 106 when an update was sent out yet be communicatively coupled with another machine that was not dormant and hence was able to receive and cache an update needed by the dormant machine. This peer machine may serve as an update source for the dormant machine.

Also illustrated are an arbitrary number of Validators 114-118. As with the update sources, a Validator, if present, may be communicatively coupled with machines 100-104. In the illustrated embodiment, if a machine 100-104 is unable to trust an Update Source or otherwise cryptographically validate an update received from the Update Source, one or more of the Validators may be contacted to authenticate the update. It will be appreciated that various cryptographic techniques may be employed to directly or indirectly validate an update by way of a Validator, including receiving a cryptographic token that ay be used to validate an update. For example, assuming a public key cryptosystem is employed to digitally sign and/or encrypt an update, if a machine ultimately receiving the update does not have the corresponding key to verify the signature and/or decrypt the update, the machine may contact a trusted Validator 114-118 to obtain the requisite key (or other information to allow the machine to determine the update is valid and may be installed/implemented).

Assuming use of multiple Validators, it will be appreciated that workloads may be distributed where Validators may be hierarchically arranged akin to distributing responsibility for resolving Domain Name System (DNS) server requests, where a chosen Validator may forward a validation request to a higher-level Validator if it is unable to resolve the validation request. Also, in some embodiments, different physical or logical connections may be utilized for different activities. For example, it may be desirable to have updates received and/or validations performed using a low-bandwidth and/or low-priority network to minimize impact to normal communication activity by non-dormant machines. Updates, in particular, could be retrieved "in the background" through use of a secondary data path, such as a slower wireless network link integrated within the machine, that is different from a primary data path having a higher throughput used for normal network communication.

Figure 2:
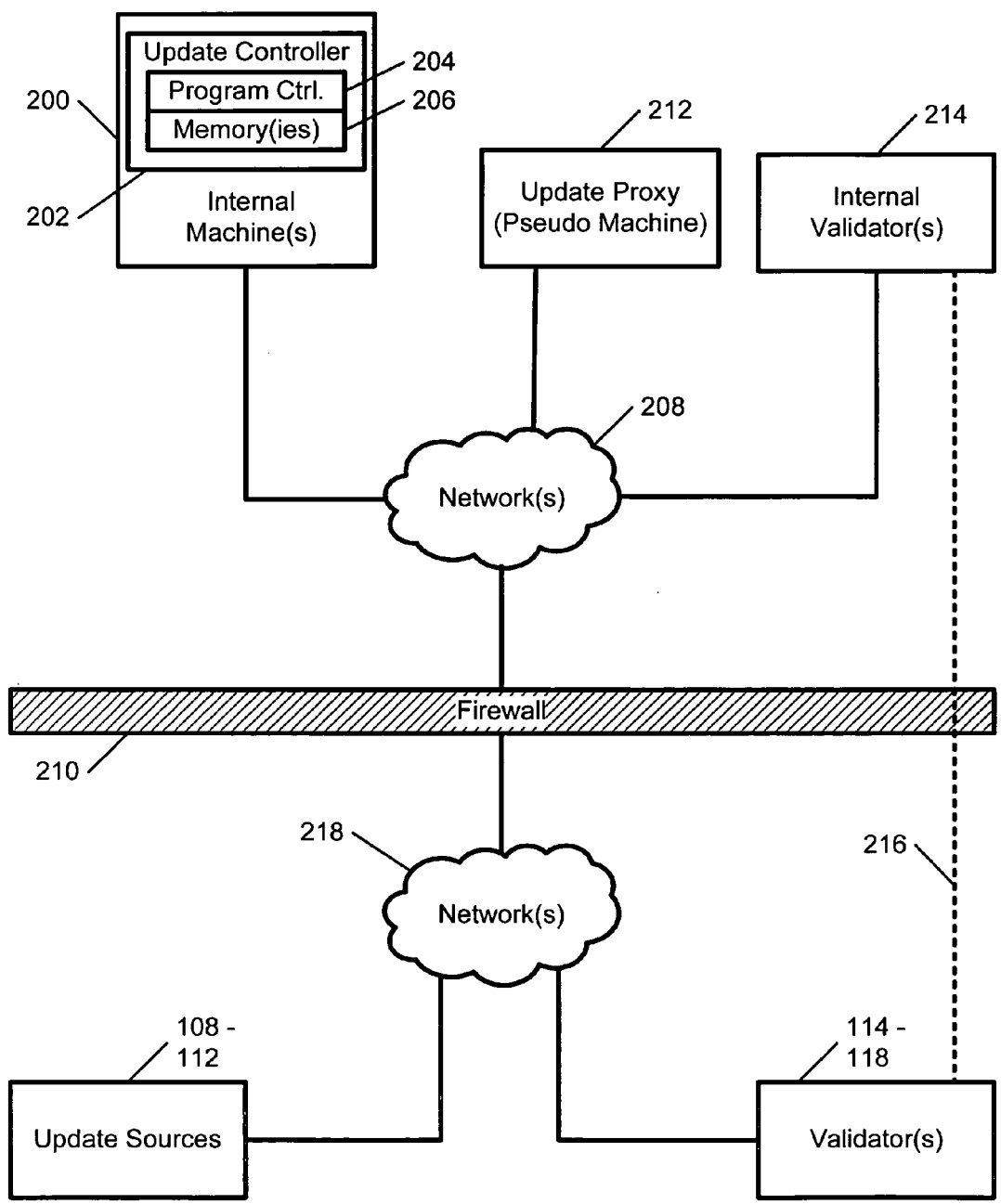
FIG. 2 illustrates a system of machines according to another embodiment for updating a machine that may enter a dormant state.

FIG. 2 illustrates a system of machines according to another embodiment for updating a machine 200 that may enter a dormant state.

In the illustrated embodiment the machine includes an Update Controller 202, which may be incorporated into a device of the machine such as a network interface card (NIC), and implemented as hardware and/or software. The Update Controller 202 may operate even if the machine has entered a dormant state. In the illustrated embodiment, the Update Controller includes Program Control 204 and a Memory (or Memories) 206, where the Program Control directs the operation of the Update Controller, and the Memory may store, for example, updates received over a network 208, 218 or the FIG. 1 data path(s) 106 while the machine is dormant. In the illustrated embodiment, the machine is labeled "Internal" to reflect that it is behind a firewall 210, however it will be appreciated that the notion of "internal" and "external" to a firewall can simply be one of perspective.

In the illustrated embodiment, also behind the firewall 210 are an Update Proxy 212 and Internal Validator 214. In some embodiments, an Update Proxy may operate as a pseudo machine, e.g., it may track the characteristics of various machines on the local network 208 and then cache updates broadcast on the local network for the various machines tracked by the Update Proxy. Thus, an Update Proxy may intelligently cache updates only for those machines for which it is interested and then provide those updates when it determines the machine is no longer dormant, e.g. by polling the machine for an active state, or when the machine pings the Update Proxy to announce its active state. Use of an Update Proxy allows consolidation of updates common to multiple devices of the local network.

The illustrated Internal Validator (or Validators) 214 operates as discussed above with respect to the FIG. 1 Validators 114-118 and may be a resource accessed by the machine 200 or the Update Proxy 212 to allow it, if needed, to validate an update received from an Update Source 108-112. In the illustrated embodiment, the Internal Validator may have a private communication path 216 with external Validators 114-116. It will be appreciated that the Firewall 210 may impede update traffic from an external network 218 to which the Update Source(s) 108-112 and Validator(s) are attached, and hence a private communication path may be established to allow the Internal Validator to obtain validation information from the external Validator(s). Similarly, an Internal Update Source (not illustrated) may be implemented with a private connection to Update Sources 108-112 to allow updates to apparently originate within network 208.

Figure 3:
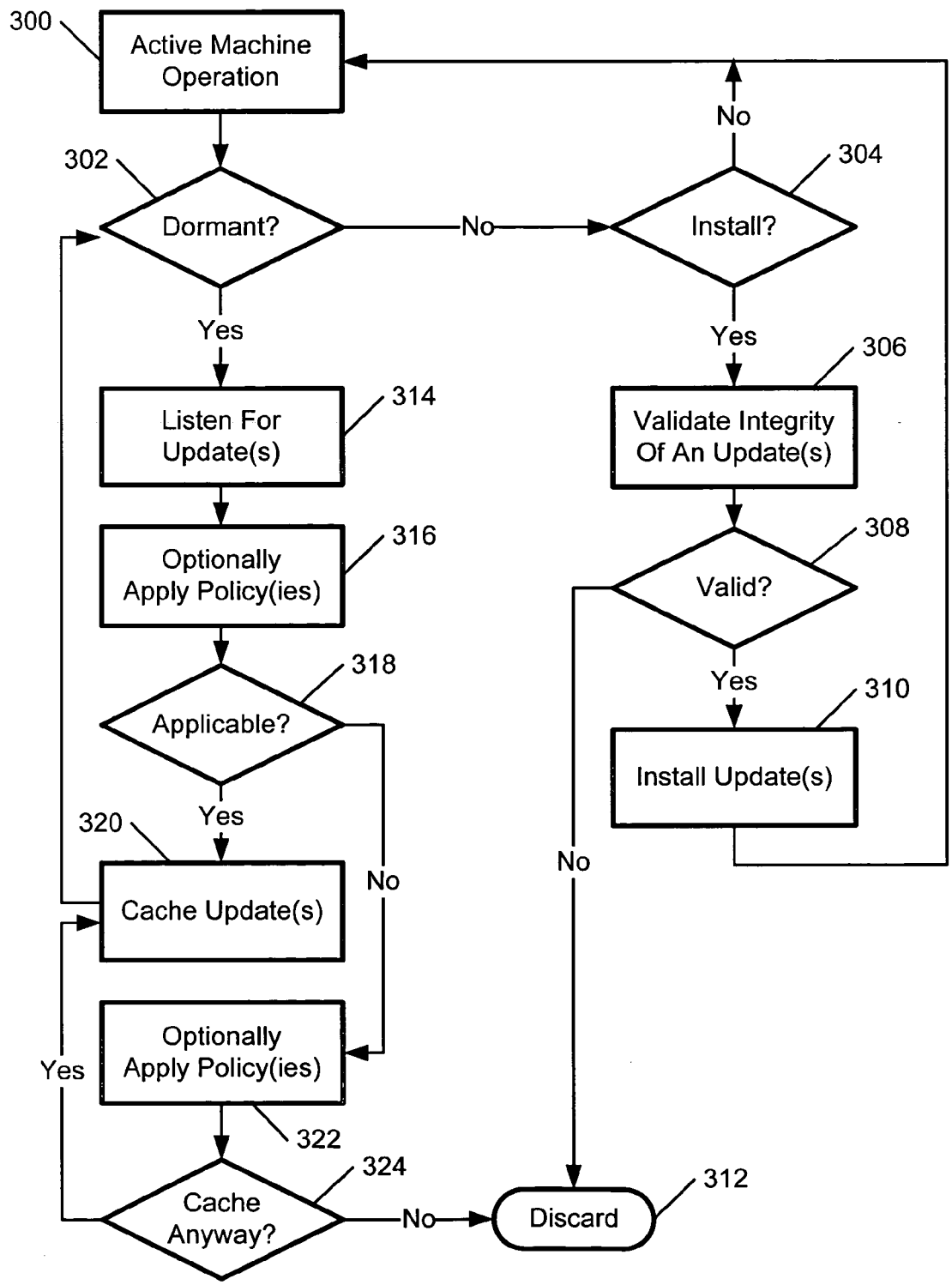
FIG. 3 illustrates a method according to one embodiment for applying an update (or updates) received for a machine while the machine was dormant.

FIG. 3 illustrates a method according to one embodiment for applying an update (or updates) received for a machine while the machine was dormant.

As discussed above, the update(s) may have been received by an active network interface of the machine, by a docking station after the machine was undocked there-from, etc. After the machine performs 300 regular, e.g., not dormant, activity, the machine may perform a test to determine if 302 machine is in a dormant state. It will be appreciated that this test may be performed by the Update Controller 202. In one embodiment, the Update Controller 202 operates asynchronously to the general operation of the machine and monitors for when the machine enters and/or leaves a dormant state. It will be appreciated that signaling may be employed to facilitate operation of the Update Controller.

If 302 the machine is not dormant (or entering a dormant state), a further test may be performed to determine if 304 an installation is required, e.g., because an update was previously received while the machine was dormant and requires installation. If so, then the integrity of an received update may be validated 306, e.g., directly by the machine if the update includes sufficient cryptographic information to allow direct validation of the update, or indirectly by way one of the Validators 114-118, 214. If 308 the update is valid, it is installed 310. If 308 the update is not valid, in the illustrated embodiment, it is discarded 312. It will be appreciated various error recovery techniques and download resumption algorithms (not illustrated) may be performed in an effort to cure defects in an update before discard.

If 302 the machine is dormant (or entering a dormant state), in the illustrated embodiment, the Update Controller listens 314 for updates, e.g., ones sent by an Update Source 108-112, the Update Proxy 212, or the like over a data path 106, network 208, 218, etc. When updates are received, the Update Controller 202 may optionally apply 316 policies to determine how the machine ought to handle certain updates. For example, security policies may dictate that certain updates be ignored, e.g., considered inapplicable, such as updates to core operating system components not originating from an internal Information Technology (IT) source, or because a user may have set a policy that video drivers are not to be applied, etc.

Based at least in part on application of policies, if any, and the applicability of a candidate (e.g., potential) update to the machine's configuration, e.g., the update would update some component of the machine, the machine may determine if 318 the candidate update is an applicable update for the machine. In the illustrated embodiment, applicable updates are cached 320 in a memory associated with the machine, such as the memory 206 pending return of the machine from its dormant state. Hence as illustrated, after caching, processing may return to testing if 302 the machine remains dormant. It will be appreciated that other actions not illustrated may be performed contemporaneously with those illustrated as the illustrated operations are intended to simply show exemplary operations that may be performed and not to represent the complete operation of the machine at any particular time.

If 318 the candidate update is not an applicable update for the machine, for example, because it updates a component not part of the machine, in the illustrated embodiment, policies may optionally be applied 322 do determine if 324 the candidate updates should be cached anyway. If 324 so, then the candidate update is cached 320 in the memory associated with the machine. Hence, after caching, processing may return to testing if 302 the machine remains dormant. If 324 not, then the update is discarded 312.

In one embodiment, rather than installing 310 updates while the machine is active, instead selected updates may be installed or pre-processed while the machine is dormant. For example, a docking station responsible for receiving and caching updates may be able to perform various pre-installation pre-processing operations to speed up installation for a machine when it does return from a dormant state. For example, it could decompress an update if needed, pre-validate it either directly or indirectly as would the machine itself were it not dormant, or, in certain circumstances, even install the update into a local memory to allow its being copied to a memory with the machine (e.g., RAM, hard disk, etc.) rather than having an installation executed on the machine, thus speeding up the update of the machine. Or, when the machine is re-docked but not woken up, the update may be installed through access to machine resources, such as a hard disk, by bypassing an operating system while the machine remains dormant.

In one embodiment, applying 316 cache policies may include applying a cache retention policy to cached updates to control how long updates remain in a cache. For example, one such policy could be to delete an update if a later superseding update has been stored. Another such policy could be to delete updates as soon as they are applied. However, one could also have overriding policies, such as a retention policy in a peer environment where updates applicable or likely to be applicable to peer devices may be retained for a longer period of time in order to forestall peer devices from having to obtain the update directly. Another policy could be to measure network throughput and if the network appears okay, then to receive an update from a network such as item 208 of FIG. 2, but if slow, then to seek the update from a peer device. Various considerations may be employed to determine which machines operate as a peer source for updates, including the capabilities of the machine, and policies such as do not share unless the network is determined to be congested.

Figure 4:
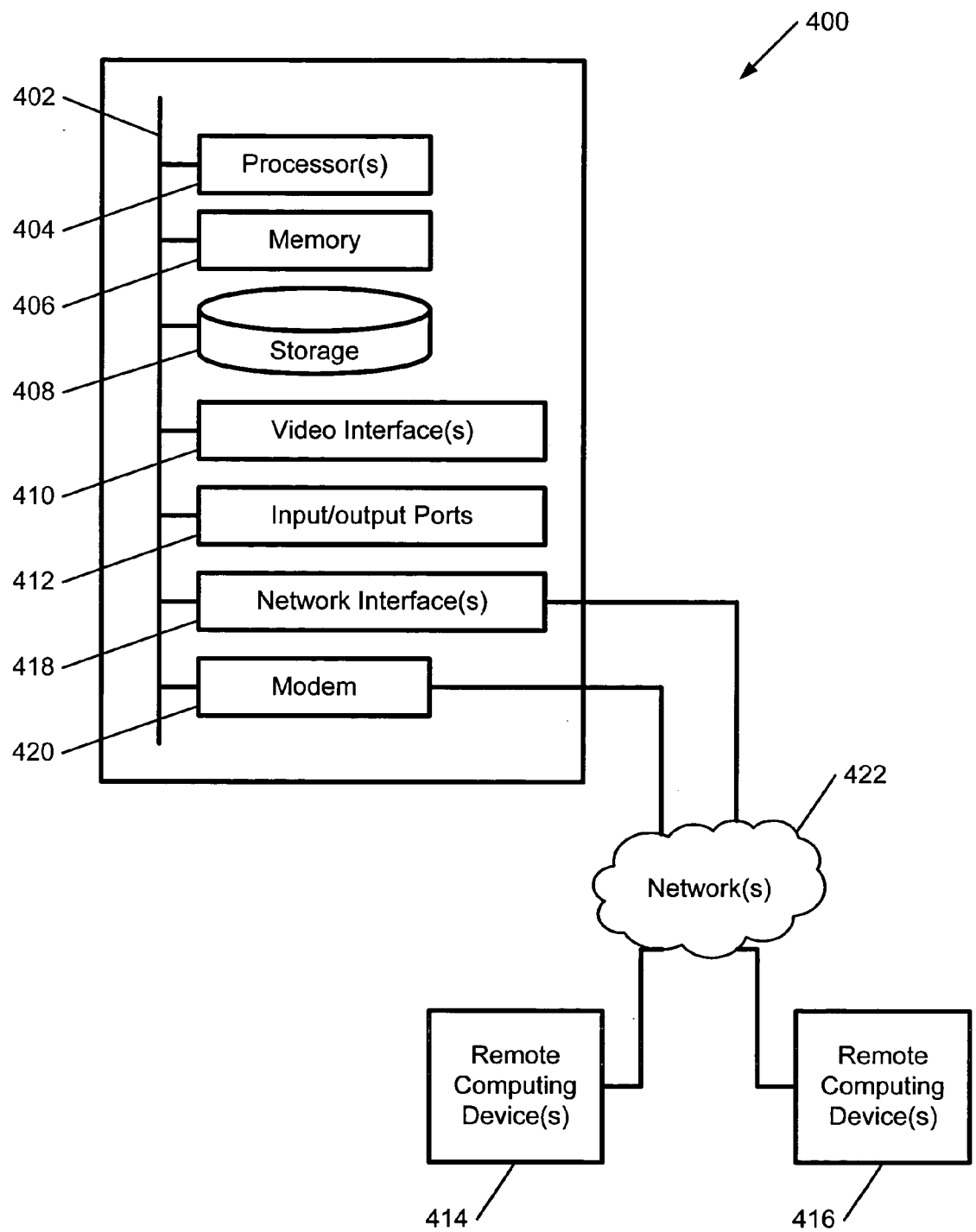
FIG. 4 illustrates a suitable computing environment in which certain aspects of the invention may be implemented.

FIG. 4 and the following discussion are intended to provide a brief, general description of a suitable environment in which certain aspects of the illustrated invention may be implemented. As used herein, the term "machine" is intended to broadly encompass a single machine, or a system of communicatively coupled machines or devices operating together, including computers and their docking stations or network access points. Exemplary machines include computing devices such as personal computers, workstations, servers, portable computers, handheld devices, e.g., Personal Digital Assistant (PDA), telephone, tablets, etc., as well as transportation devices, such as private or public transportation, e.g., automobiles, trains, cabs, etc.

Typically, the environment includes a machine 400 that includes a system bus 402 to which is attached processors 404, a memory 406, e.g., random access memory (RAM), read-only memory (ROM), or other state preserving medium, storage devices 408, a video interface 410, and input/output interface ports 412. The machine may be controlled, at least in part, by input from conventional input devices, such as keyboards, mice, etc., as well as by directives received from another machine, interaction with a virtual reality (VR) environment, biometric feedback, or other input source or signal.

The machine may include embedded controllers, such as programmable or non-programmable logic devices or arrays, Application Specific Integrated Circuits, embedded computers, smart cards, and the like. The machine may utilize one or more connections to one or more remote machines 414, 416, such as through a network interface 418, modem 420, or other communicative coupling. Machines may be interconnected by way of a physical and/or logical network 422, such as the data paths 106 of FIG. 1, the network(s) 208 of FIG. 2, an intranet, the Internet, local area networks, and wide area networks. One skilled in the art will appreciated that communication with network 422 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc. Further, these different communication possibilities may each have associated throughput characteristics and costs and may be used at least in part by policies to control how updates are received and applied to a machine.

The invention may be described by reference to or in conjunction with "associated data" such as functions, procedures, data structures, application programs, design representations, formats for simulation, emulation, or fabrication of a design, etc. which when accessed by a machine results in the machine performing tasks or defining abstract data types or low-level hardware contexts. Associated data representing a design may represent the design in a number of manners. First, as is useful in simulations, hardware may be represented using a hardware description language or another functional description language which essentially provides a computerized model of how the designed hardware is expected to perform.

Associated data may be stored in, for example, volatile and/or non-volatile memory 406, or in storage devices 408 and/or associated storage media, including conventional hard-drives, floppy-disks, optical storage, tapes, flash memory, memory sticks, digital video disks, etc., as well as more exotic mediums such as holographic storage and machine-accessible biological state preserving storage. Associated data for hardware models may be stored so the model may be simulated using simulation software that applies a particular test suite to the hardware model to determine if it functions as intended.

Associated data may be delivered over transmission environments, including network 422, in the form of packets, serial data, parallel data, electromagnetic propagated signals, etc., and may be used in a compressed or encrypted format. Associated data may be used in a distributed and/or peer-to-peer environment, and stored locally and/or remotely for access by single or multi-processor machines. Associated data may be used by or in conjunction with embedded controllers; hence in the claims that follow, the term "logic" is intended to refer generally to possible combinations of associated data and/or embedded controllers.

Thus, for example, with respect to the illustrated embodiments, assuming machine 400 embodies the Machine 1 100 of FIG. 2, then remote machines 414, 416 may respectively be FIG. 2 Machine 102 and Update Source 108 providing updates to one or both of machines 100, 102 depending on their current update status. It will be appreciated that remote machines 414, 416 may be configured like machine 400, and therefore include many or all of the elements discussed for machine.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method of updating a machine having at least a dormant state and an active state, the method comprising:
  in the dormant state,
    listening, by the machine, to a first network for a candidate update, determining, by the machine, the candidate update is an applicable update for the machine based at least in part on a security standard, and caching, by the machine, the applicable update in a memory of the machine via a second network having a higher data throughput than the first network; and in the active state, validating, by the machine, an integrity of the applicable update.

2. The method of claim 1, further comprising applying by the machine the applicable update while the machine is in the dormant state.

3. The method of claim 1, further comprising listening by the machine to the first network while the machine is in the dormant state for a token which may be cryptographically applied to the applicable update to facilitate said validating the applicable update.

4. The method of claim 1, said validating comprising retrieving while in the active state integrity validation data for the applicable update over the second network.

5. The method of claim 1, further comprising:
periodically applying by the machine a cache retention policy to cached updates.

6. The method of claim 1, further comprising the machine acting as a peer-source for retrieval by peer machines of said cached applicable updates.

7. The method of claim 6, further comprising determining by the machine whether the first network has congestion, and at least while congested, performing said acting as a peer-source.

8. The method of claim 1, further comprising:
selectively storing by the machine a non-applicable candidate update in another memory of the machine; and
the machine acting as a peer-source for retrieval by peer machines of the applicable update or the non-applicable update.

9. The method of claim 1, wherein the first network comprises a wireless network.

10. The method of claim 1, wherein entering the dormant state for the machine comprises the machine performing selected ones of: initiating a low power operational state, executing a stand-by mode, executing a power-off mode, executing a sleep mode, shutting down a display associated with the machine, or undocking from a docking station.

11. The method of claim 1, wherein entering the active state for the machine comprises the machine performing selected ones of: executing a wake-up mode, activating a display associated with the machine, and docking with a docking station.

12. The method of claim 1, further comprising replacing a first update cached in the memory with a second update received over the second network.

13. An apparatus comprising:
a data interface configured to receive messages and updates from a first and second network respectively, the second network having a higher data bandwidth than the first network;
a logic arrangement configured to listen to the first network via the data interface, in a dormant state, for a candidate update message, determine, while in the dormant state, whether the message identifies a candidate update that is an applicable update for the apparatus based on at least a security standard, cache, while in the dormant state, the applicable update onto the apparatus from the second network via the data interface, and validate, while in the active state, an integrity of the applicable update.

14. The apparatus of claim 13, wherein the logic arrangement is further configured to validate an integrity of the applicable update in the active state.

15. The apparatus of claim 13, wherein
the logic arrangement is configured to retrieve from the second network, via the data interface, integrity validation data for the applicable update, and validate the applicable update by applying said integrity validation data to the applicable update.

16. The apparatus of claim 13, further comprising:
a cache controller, configured to delete a cached update, execute a cached update, and replace a cached update.

17. An article comprising a machine-readable medium that contains instructions for facilitating updates over a first and a second network for a processing platform having at least a dormant state and an active state, which when executed by the processing platform, cause said processing platform to perform operations comprising:
in the dormant state,
listening to the first network for a candidate update,
determining the candidate update is an applicable update for the processing platform based at least in part on a security standard, and
caching the applicable update in a memory via the second network having a data bandwidth greater than the first network; and
in the active state, validating an integrity of the applicable update.

18. The article of claim 17, said instructions further comprising instructions, which when executed by the processing platform, cause said processing platform to perform operations comprising:
applying the applicable update while the processing platform is in the dormant state.

19. The article of claim 17, said instructions further comprising instructions, which when executed by the processing platform, cause said processing platform to perform operations comprising:
listening to the first network while the processing platform is in the dormant state for a token which may be cryptographically applied to the applicable update to facilitate said validating the applicable update.

20. The article of claim 17, said instructions for said validating further comprising instructions, which when executed by the processing platform, cause said processing platform to perform operations comprising:
retrieving while in the active state integrity validation data for the applicable update over a second network having a higher data throughput than the first network.

21. The article of claim 17, said instructions further comprising instructions, which when executed by the processing platform, cause said processing platform to perform operations comprising:
periodically applying a cache retention policy to cached updates.

22. The article of claim 17, said instructions further comprising instructions, which when executed by the processing platform, cause said processing platform to perform operations comprising:
acting as a peer-source for retrieval by peer processing platforms of said cached applicable updates.

23. The article of claim 17, said instructions further comprising instructions, which when executed by the processing platform, cause said processing platform to perform operations comprising:
determining the first network has congestion, and at least while congested, performing said acting as a peer-source.

24. The article of claim 17, said instructions further comprising instructions, which when executed by the processing platform, cause said processing platform to perform operations comprising:
   selectively storing a non-applicable candidate update in a second memory; and
   acting as a peer-source for retrieval by peer processing platforms of the applicable update of the first memory or the non-applicable update of the second memory.

* * * * *